Sept. 20, 1949.　　　　I. BOTWINICK　　　　2,482,239
MOLD FOR FORMING ORNAMENTAL
PLASTIC BUTTONHOLE CASINGS
Filed April 30, 1947　　　　　　　　3 Sheets-Sheet 1
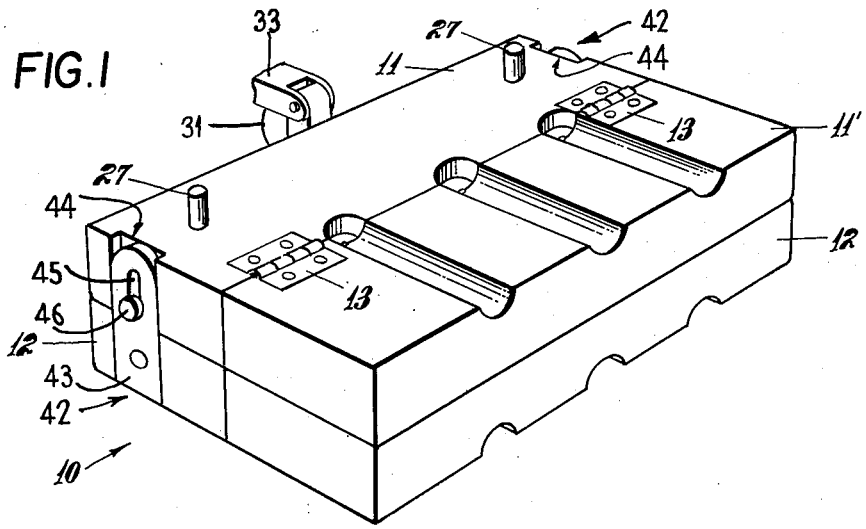
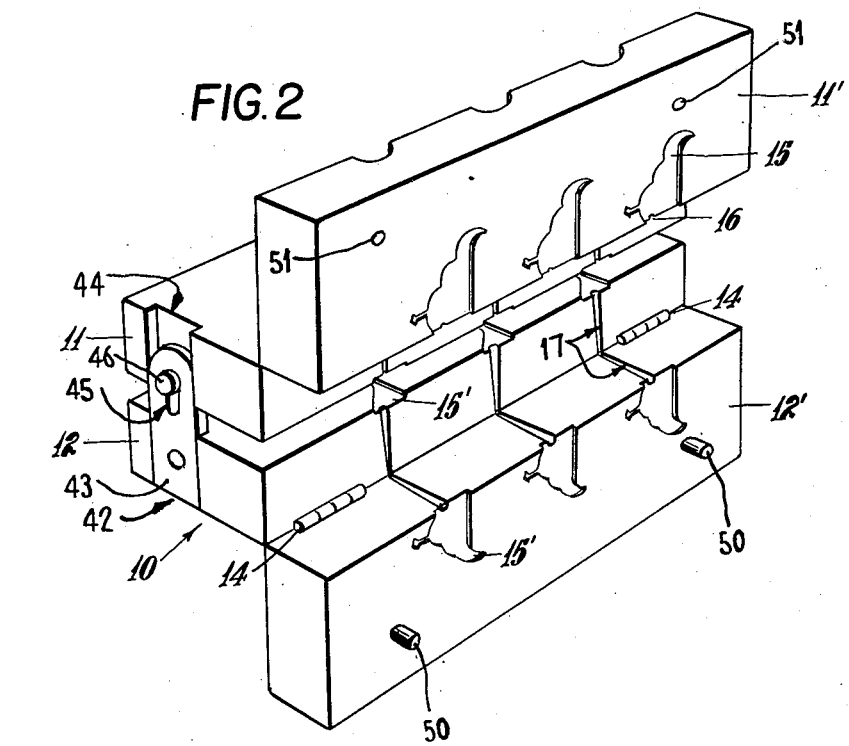
ISRAEL BOTWINICK
INVENTOR
BY Joseph Blacker
ATTORNEY Sept. 20, 1949.　　　　I. BOTWINICK　　　　2,482,239
MOLD FOR FORMING ORNAMENTAL
PLASTIC BUTTONHOLE CASINGS
Filed April 30, 1947　　　　　　　　　　3 Sheets-Sheet 2
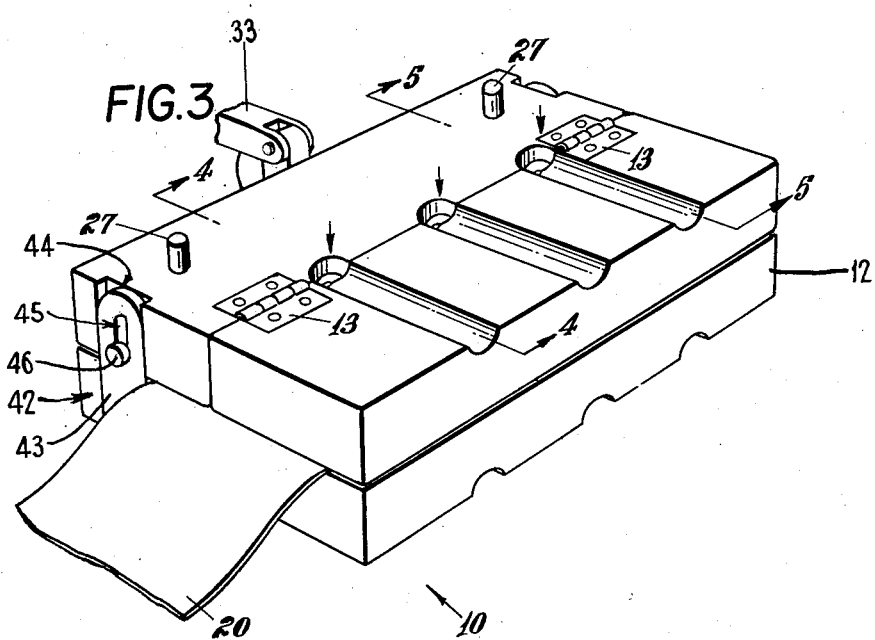
ISRAEL BOTWINICK
INVENTOR
BY Joseph Blacker
ATTORNEY Sept. 20, 1949.　　　　　　　I. BOTWINICK　　　　　　　2,482,239
MOLD FOR FORMING ORNAMENTAL
PLASTIC BUTTONHOLE CASINGS
Filed April 30, 1947　　　　　　　　　　　　　　3 Sheets-Sheet 3
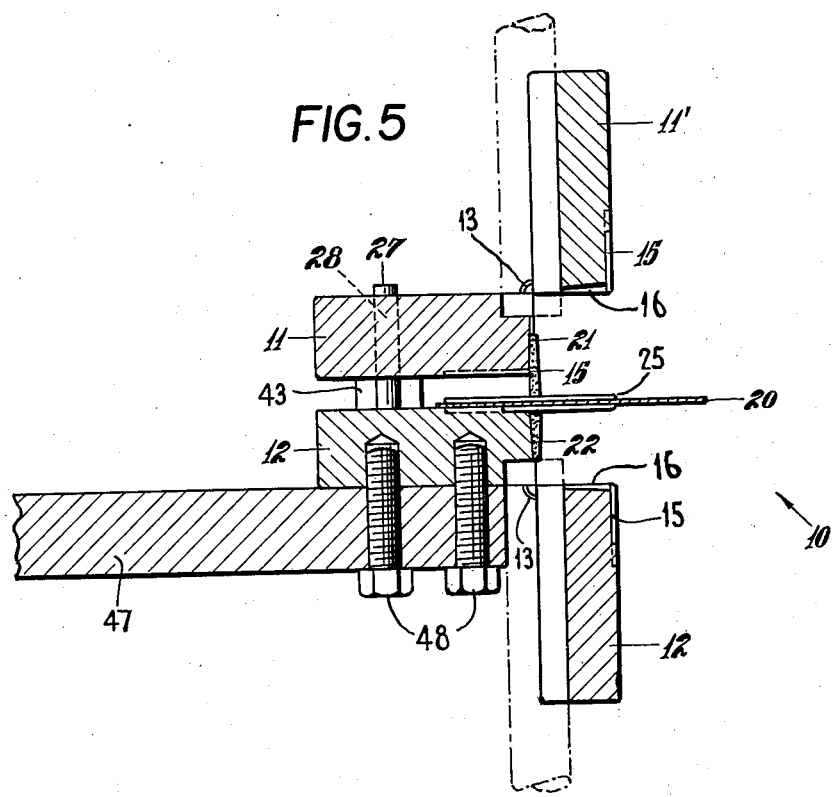
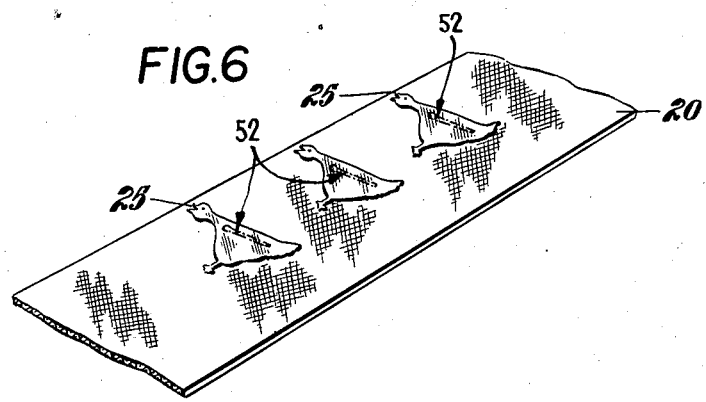
ISRAEL BOTWINICK
INVENTOR
BY *Joseph Blacker*
ATTORNEY Patented Sept. 20, 1949

2,482,239

UNITED STATES PATENT OFFICE 2,482,239

MOLD FOR FORMING ORNAMENTAL PLASTIC BUTTONHOLE CASINGS

Israel Botwinick, Brooklyn, N. Y.

Application April 30, 1947, Serial No. 744,871

2 Claims. (Cl. 18—36)

1

This invention relates to a four-section mold for molding plastic ornamental buttonhole figures on fabrics.

An object of this invention is to provide a four-section mold, whereby plastic ornamental figures may be molded on both sides of a piece of cloth with the sprues perpendicular to the ornamental figures.

Another object of this invention is to provide a four-section mold of the character described, whereby finished plastic ornamental figures and sprues attached thereto may be removed from the mold as a unit.

Another object of this invention is to provide a mold for forming a plurality of individually injected plastic figures on a fabric without having any ribs connecting the figures when removed from the mold.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a perspective view of the four-section mold in closed position.

Figure 2 is a perspective view of the mold in open position, and showing the lower mold cavities and gates.

Figure 3 is a perspective view of the four-section mold in operative position and showing a section of fabric extending therefrom, a portion of the fabric being inside the mold and having the ornamental buttonhole figures applied thereto.

Figure 4 is a cross-sectional view, the section being taken as on line 4—4 in Figure 3.

Figure 5 is a cross-sectional view of the mold in open position and showing a section of fabric having ornamental plastic figures secured thereto on opposite sides of the fabric.

Figure 6 is a fragmentary plan view of the section of fabric when removed from the mold and showing plastic ornamental figures bonded thereto and having buttonhole slits made therein in a slitting device.

In the illustrated embodiment of the invention, the numeral 10 indicates a four-section mold which is of rectangular form and comprises two upper hinged sections 11, 11', and two lower hinged sections 12, 12'.

The upper mold section 11' is pivotally mounted on the section 11 by means of hinges 13. The lower mold section 12' is pivotally mounted on the section 12 by means of hinges 14.

The two lower mold sections 12, 12', comprise a two-member ornamental cavity 15' and complementary gateways 17 for feeding material to the cavity 15'.

2

Figure 2 shows the upper and lower mold sections 11, 12, in spaced-apart relation to permit a section of fabric 20 to be inserted therebetween. Figures 3 and 4 show the section of fabric inserted intermediate the cavities 15, 15', and in operative position whereby thermoplastic material may be fed through the gateways into the cavities.

The cavity in the lower mold sections may be of a design identical to the cavity in the upper mold sections. The upper and lower mold sections are held in alinement or registry so that the ornamental figures are in superposed relation.

In operation, the heated thermoplastic material is injected through the upper and lower gateways 16, 17, and fill the upper and lower cavities 15, 15', simultaneously, the pressure under which the heated material is injected causes the material to be solidly impressed into the pores or interstices in the fabric and so that upon cooling, the superposed ornamental figures remain bonded as a permanent part of the fabric and are not removable therefrom when cleaned.

As shown in open position in Figure 5, the upper mold sections 11, 11', are in right-angular relation and the lower mold sections 12, 12' are in right-angular relation. The upper and lower mold sections 11, 12, are spaced apart to permit removal of the ornamented fabric 20. It is to be noted that upper and lower sprues 21, 22, are attached to the ornamental fabric when it is removed from the mold. This permits cutting off and removal of the sprues from the ornamental figures after molding and so that in the completed product no plastic connections or sprues appear between the ornamental figures.

It is to be noted that the two upper mold sections 11, 11' jointly comprise a two-member ornamental cavity 15. (Figure 5.) The adjoining walls of the sections 11, 11' have complementary gateways 16 for feeding material to the cavity 15.

Figure 6 is a fragmentary plan view of a section of fabric 20 when removed from the mold 10. Superposed plastic ornamental figures 25 are bonded to the fabric and may be of identical design and in exact superposed relation on the upper and lower surfaces of the fabric. I may, however, make the lower figure blank, or without ornamentation.

The lower section 12 has dowel pins 27 suitably fixed therein. The upper section 11 has openings 28 for the dowel pins, whereby the upper and lower complemental sections are movable in parallel spaced-apart relation to and from each other to grip and support a section of fabric intermediate the cavities 15, 15'.

As best shown in Figure 4, the lower mold section 12 has an integral upright extension 30 at its rear face. The extension 30 has an integral bracket 31 with a horizontal face which is substantially in alinement with the upper face of the upper mold section when in lowered position. At the upper end of the extension 30 is a pivot pin 32. A link 33 has one end pivotally mounted on the pin 32.

At the front end of the mold 10 is an upright lever 34 which is pivotally secured on a pin 35 at the front end of the link 33. At the lower end of the lever 34 is a horizontal extension in which an eccentric 36 is rotatably mounted. A handle 38 is bent at one end to form a journal 39 for the eccentric. The eccentric 36 is suitably keyed (not shown) to the journal 39.

It will be seen by reference to Figure 4, that the link 33 and the lever 34 may be swung towards the front of the mold and when the eccentric 36 is forced upwardly into contacting relation with the lower surface of the lower mold section 12, the eccentric forcibly brings the upper and lower mold sections in pressure contacting relation against the fabric and so that the mold is ready for a molding operation.

When the operator swings the handle 38 into an upward direction toward the mold, he brings the eccentric downward and releases the grip on the two mold sections and on the fabric. The operator may then swing the link 33 and the lever 34 on the pin 32 in a direction to the left of the mold, when the link comes into contacting relation with the upper surface of the bracket 31 and this brings the linkage entirely out of the way of the mold. The upper mold section may then be raised away from the lower mold section as shown in Figures 2 and 5, when the operator may remove the molded fabric from the mold.

Limit stops 42 are provided at opposite ends of the mold 10. The stops comprise arms 43 suitably fixed to the lower mold section 12 and fitting in upright rectangular guideways 44 in the upper mold section 11.

The arms 43 have through slots 45 in which are pins 46 fixed in the upper mold section 11. When the mold section 11 is raised above the lower mold section 12, the upper walls of the slots 45 limit this upward movement and maintain the unitary relation of the mold sections.

As shown in Figures 4 and 5 the mold 10 may be secured to a table 47 by bolts 48 in a manner to permit lowering the section 12 to inoperative position.

It is to be noted that, when the pressure of the injection is made sufficiently high, the bonded plastic material may be made to completely fill the interstices in the fabric and so that the upper and lower plastic layers of material approach each other and come into actual contact with each other.

It is also to be noted that the mold 10 may be used for molding with thermoplastic as well as with thermosetting materials.

As shown in Figure 2, there is provided dowel pins 50 extending from the lower mold section 12' a distance equal to or slightly less than the distance between the mold sections when in open position. Cavities 51 in the upper mold section 11' serve to receive the dowel pins 50. The dowel pins 50 serve as a means for alining the sections 11' and 12', and may be taken as representing any suitable means for performing the same function.

It is to be noted that if desired, buttonhole slits 52 may be made in the figures 25 shown in Figure 6. However, there may be conditions when the slits may be omitted so as to form superposed plastic figures on any portion of a garment or other article.

In accordance with the patent statutes I have described and illustrated the preferred embodiment of my invention, but it will be understood that various changes and modifications can be made therein without departing from the spirit of the invention as defined by the appended claims.

I claim:

1. In an injection apparatus for molding buttonhole elements in superposed relation on opposite sides of a section of fabric with the sprues attached to said fabric and jointly removable from said mold after molding, a four-section mold, said mold comprising two pivotally mounted complemental upper sections and two pivotally mounted complemental lower sections, said complemental sections having superposed cavities and separate injection gates for said cavities, one section of said complementary lower sections having dowel pins fixed therein and extending upwardly, and one section of said complementary upper sections having openings for said dowel pins and being slidable on said pins to and from said lower sections, whereby said upper and lower complemental sections are movabel toward each other to grip and support a section of fabric intermediate said cavities, and means for injecting thermoplastic material through said gates into said cavities simultaneously to cause said buttonhole elements to be bonded to the upper and lower surfaces of said fabric.

2. An injection apparatus for molding plastic elements in superposed relation on opposite sides of a section of fabric with the sprues attached to said fabric and jointly removable from said mold after molding, comprising a four-section mold having complemental upper sections and complemental lower sections, said complemental sections having superposed cavities and separate injection gates for said cavities, one section of said complementary lower sections having alining means therein and extending upwardly, and one section of said complementary upper sections having receiving means for said alining means and being movable in parallel planes and in spaced-apart relation to and from said lower sections, whereby said upper and lower complemental sections are movable toward each other to grip and support a section of fabric intermediate said cavities, means for locking said upper and lower complemental sections in pressure contacting relation against said fabric, and means for injecting plastic material through said gates into said cavities simultaneously to cause said elements to be bonded to the upper and lower surfaces of said fabric.

ISRAEL BOTWINICK.

REFERENCES CITED

The following references are of record in the file of this patent:

UNITED STATES PATENTS

| Number | Name | Date |
|---|---|---|
| 1,083,841 | Leblanc | Jan. 6, 1914 |
| 2,415,961 | Nast | Feb. 18, 1947 |

FOREIGN PATENTS

| Number | Country | Date |
|---|---|---|
| 463,659 | France | Mar. 2, 1914 |